US012758946B2

(12) United States Patent
Khramov et al.

(10) Patent No.: US 12,758,946 B2
(45) Date of Patent: Oct. 13, 2026

(54) PROCESS FOR CATALYST REGENERATION

(71) Applicant: Ascend Performance Materials Operations LLC, Houston, TX (US)

(72) Inventors: Mikhail I. Khramov, Houston, TX (US); C. Alex Diaz, Houston, TX (US); Scott G. Moffatt, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 458 days.

(21) Appl. No.: 18/501,308

(22) Filed: Nov. 3, 2023

(65) Prior Publication Data

US 2024/0149248 A1 May 9, 2024

Related U.S. Application Data

(60) Provisional application No. 63/422,811, filed on Nov. 4, 2022.

(51) Int. Cl.
*B01J 21/20* (2006.01)
*B01J 38/30* (2006.01)

(52) U.S. Cl.
CPC ............... *B01J 21/20* (2013.01); *B01J 38/30* (2013.01)

(58) Field of Classification Search
CPC ... B01J 21/20; B01J 38/12; B01J 38/30; B01J 29/04; B01J 29/90
USPC ........................................ 502/38, 39, 41, 64
See application file for complete search history.

(56) References Cited

U.S. PATENT DOCUMENTS 3,919,115 A * 11/1975 Stine .......................... B01J 8/26 502/42
6,531,595 B2 * 3/2003 Holderich ........... C07D 201/04 540/536

FOREIGN PATENT DOCUMENTS

CN 111004148 A * 4/2020 ........... C07C 253/20
CN 112657548 A * 4/2021 .............. B01J 29/83
CN 112876381 A * 6/2021 ........... C07C 231/10
CN 113413924 A * 9/2021 .............. B01J 38/02

OTHER PUBLICATIONS

Written Opinion for PCT/US2023/078594. (Year: 2024).*
International Search Report for international application No. PCT/US2023/078594 mailed on Feb. 22, 2024.

* cited by examiner

*Primary Examiner* — Patricia L. Hailey
(74) *Attorney, Agent, or Firm* — Womble Bond Dickinson (US) LLP

(57) ABSTRACT

A process for regenerating a deactivated catalyst, the process comprising contacting a deactivated aluminosilicate zeolite catalyst comprising a nitrogen-containing contaminant with an oxidant to provide a regenerated catalyst comprising less than 0.5% contaminant and a regeneration by-product stream comprising nitrogen.

20 Claims, 1 Drawing Sheet

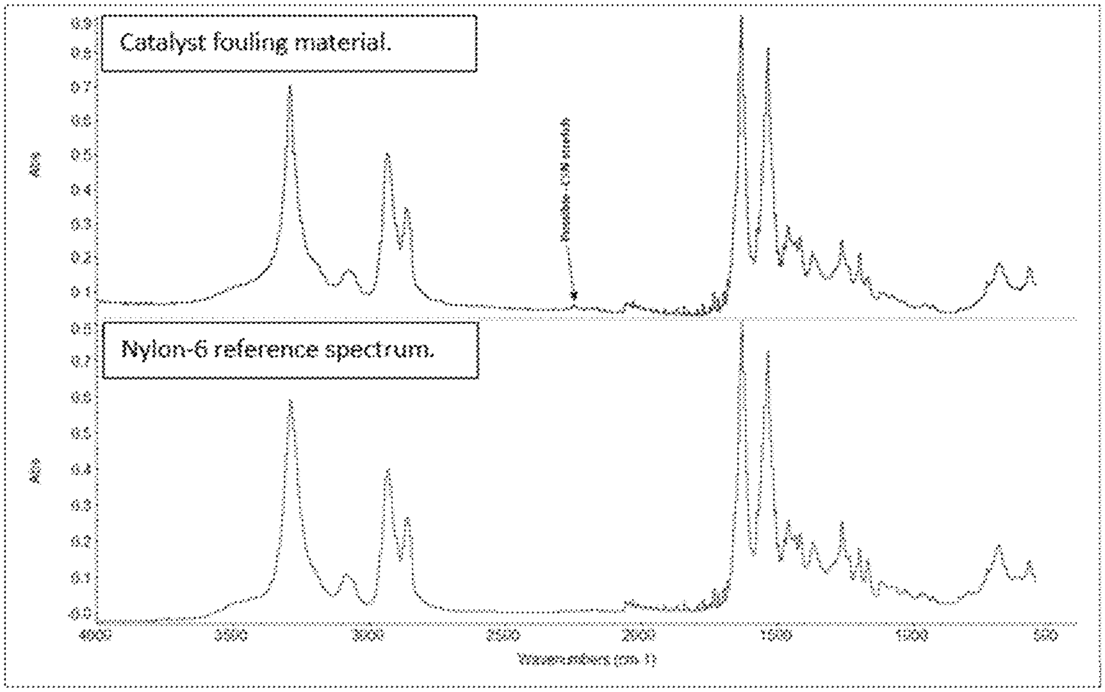
Catalyst fouling material.
Nylon-6 reference spectrum.
Abs
0.9
0.8
0.7
0.6
0.5
0.4
0.3
0.2
0.1
0.0
4000
3500
3000
2500
2000
1500
1000
500
Wavenumbers (cm-1)

PROCESS FOR CATALYST REGENERATION

CROSS-REFERENCE TO RELATED APPLICATION

This application claims priority from U.S. Provisional Application No. 63/422,811 entitled "Process For Catalyst Regeneration" filed Nov. 4, 2022, the disclosure of which is incorporated herein by reference in its entirety

FIELD

The present disclosure provides a process for regenerating a catalyst, e.g., an aluminosilicate zeolite catalyst. Specifically, the present disclosure provides a method of oxidative regeneration of aluminosilicate zeolite catalysts used in the production of aminocapronitrile (ACN) from caprolactam.

BACKGROUND

Some methods for regenerating deactivated catalysts used in the synthesis of 6-aminocapronitrile from caprolactam are known. Conventional catalysts generally include active metals and/or synergists such as phosphorous. And conventional methods to regenerate these catalysts include hydrolysis treatment to react/remove contaminants therefrom.

Some other regeneration methods are also known. For example, CN113413924A discloses a catalyst regeneration method which comprises the following steps: oxygen-containing gas is introduced into a regeneration device filled with a deactivated catalyst, and the regeneration device is provided with n uniformly distributed inlets or comprises n regenerators connected in series; oxygen-containing gas is supplemented from the second inlet to the nth inlet or from the second regenerator to the nth regenerator, and regeneration of the deactivated catalyst is carried out, wherein n is a natural number larger than or equal to 2, the oxygen content of the oxygen-containing gas in the regeneration process is increased in a gradient mode along with the regeneration time, and the regeneration temperature is increased in a gradient mode along with the regeneration time. The deactivated catalyst contains carbon-containing harmful substances.

CN111646921A discloses a catalyst regeneration method for preparing a key intermediate 6-aminocapronitrile of hexamethylene diamine by a caprolactam method. The catalyst regeneration method comprises the following steps: and (3) carrying out hydrolysis treatment or dissolution treatment on the catalyst to be regenerated to obtain the regenerated catalyst. According to the method, the catalyst to be regenerated is hydrolyzed or dissolved, so that polymers on the catalyst to be regenerated are hydrolyzed to form substances such as caprolactam and the like or directly dissolve out coking substances, the blockage of the polymers on the catalyst is removed, and the regeneration treatment of the catalyst is realized.

CN112657548A discloses a regeneration method of a caprolactam ammoniation dehydration catalyst. The invention adopts the following steps: a regeneration system using an inert gas to fill the catalyst; roasting the catalyst to be regenerated at a certain temperature, and simultaneously purging the system by using mixed gas containing ammonia, organic amine and oxygen at a certain flow rate as activating gas; and when the gas outlet composition of the activated gas is consistent with the gas inlet composition, continuously purging for a certain time, and finishing regeneration.

CN112876381A discloses a simulated moving bed device and a method for preparing 6-aminocapronitrile by a gas phase method, wherein the device comprises at least 3 stages of fixed bed reactors which are arranged in a regular polygon shape; at least two stages in the front of the fixed bed reactor are sequentially connected in series to form a reaction section, and the last stage forms a regeneration section; the fixed bed reactor intermittently rotates around the central shaft, the first stage fixed bed reactor becomes a regeneration section after the rotation, and the regeneration section becomes the last stage fixed bed reactor of the reaction section.

Even in view of the known processes, the need exists for improved processes for regenerating (aluminosilicate zeolite) catalysts that comprise nitrogen-containing compounds as contaminants and that yield a vent gas comprising nitrogen and optionally carbon dioxide.

SUMMARY

The present disclosure relates to a process for regenerating a deactivated catalyst, comprising contacting the deactivated catalyst comprising a nitrogen-containing contaminant with an oxidant to provide a regenerated catalyst comprising less than 0.5% contaminant and a regeneration by-product stream comprising nitrogen. The nitrogen-containing contaminants are non-carbonaceous contaminants, comprising polyamide polymers, polyamide oligomers, amide monomers, carboxylic acids, caprolactam, aminocaproic acid, or high boiling point products, or combinations thereof. The catalyst comprises an aluminosilicate zeolite catalyst, which comprises less than 1 wt. % phosphorous. The oxidant comprises oxygen, a mixture of nitrogen and oxygen, a mixture of air and oxygen, or air, which is added at a steady rate.

The regeneration by-product stream further comprises carbon dioxide and water; specifically, the regeneration by-product stream comprises from 0.1 to 20 mol. % carbon dioxide, from 0.1 to 40 mol. % water, and from 0.1 to 99 mol. % nitrogen. The regeneration by-product stream may further comprise amines having a molecular weight below 105 g/mol.

The contacting does not employ a hydrolysis reaction, and is conducted at a temperature greater than 400° C., e.g., from 400° C. to 600° C., and a pressure of 0 to 50 psig. The regenerated catalyst is used in an ammonialytic lactam cleavage/dehydration reaction.

BRIEF DESCRIPTION OF THE DRAWING

FIG. 1 is an IR spectrum of a catalyst contaminant as disclosed herein compared to a PA6 reference spectrum, as described in Example 2 below.

DETAILED DESCRIPTION

Introduction

As noted above, some conventional processes for the regeneration of deactivated catalysts used in the production of 6-aminocapronitrile (ACN) from caprolactam are known. These processes may rely upon hydrolysis. An example of catalyst regeneration using this process involves hydrolysis of contaminants on the deactivated catalyst by treatment with an acidic or basic solution, followed by distillation of the solution to recover caprolactam. This process is time-, energy-, and resource-intensive due to its use of aqueous solutions and distillation procedures. Other regeneration processes focus on carbonaceous contaminants, not nitrogen-containing compounds. These processes fail to address the removal of specific contaminants and also fail to address the composition of the environmentally unfriendly vent streams that result from the conventional regeneration.

The inventors have now found that some catalysts comprise nitrogen-containing compounds as contaminants. These nitrogen-containing compounds are chemically different from the conventional carbonaceous contaminants. Specifically, these conventional carbonaceous contaminants are not (nitrogen-containing) polymers or oligomers and/or these carbonaceous contaminants may have high carbon content, unlike the nitrogen-containing contaminants described herein.

Also, conventional catalysts often comprise significant amounts of phosphorus, which adds complexity to the removal process.

It has been discovered that certain treatments are particularly effective in the removal of the nitrogen-containing contaminant compounds. And in some cases, the disclosed treatments work particularly well for catalysts that contain little or no phosphorus (unlike the phosphorus-containing catalyst of conventional processes). Beneficially, these methods do not require hydrolysis or its accompanying reactant streams. Without being bound by theory, it is postulated that the contaminated catalyst is effectively regenerated because the contact with the oxidant results in the complete oxidation of nitrogen containing contaminants to carbon dioxide, water and nitrogen. Importantly, unlike conventional catalysts, the catalysts disclosed herein contain little or no phosphorous; therefore, the oxidation by-products do not include environmentally unfriendly products such as phosphorous pentoxide.

Unlike conventional processes requiring substantial temperature changes, it has been found that the process to regenerate the deactivated catalyst may be conducted using a slight temperature gradient. Specifically, as discussed further below, the disclosed process may use a temperature gradient in which the difference between the initial temperature and the final temperature is less than 350° C. This slight temperature gradient is beneficial as smaller changes in temperature require lower energy input, resulting in a more environmentally friendly process.

Further, it has been found that the time required to regenerate the catalyst may be much shorter than that required by conventional methods, as discussed further below. This shorter regeneration time is beneficial for efficiency as far less production time is lost to catalyst regeneration.

Additionally, the disclosed processes yields an environmentally-friendly vent stream that advantageously comprises high amounts of nitrogen and, importantly, little if any environmentally-unfriendly components, e.g., carbon monoxide, ammonia, nitrogen oxides, or phosphorus-containing compounds such as phosphorous pentoxide.

Still further, the disclosed process achieves significant improvement in regeneration without the need for complex oxygen feed configurations. In contrast, conventional regeneration processes require elaborate and/or convoluted concentration profiles wherein oxygen concentration and or feed rates are manipulated over time. Such profiles are highly-involved and require significant engineering, structure, and capital expenditure. In contrast, the disclosed process may employ a simple oxygen feed that is consistent and steady, which reduces or eliminates engineering complication.

Catalyst Regeneration

The present disclosure relates to a process for regenerating a deactivated catalyst, for example, a catalyst in an ammonialytic lactam cleavage/dehydration reaction or an ammonialytic depolymerization reaction. The deactivated catalyst may comprise a base catalyst, e.g., an aluminosilicate zeolite, and a nitrogen-containing contaminant composition. The process may comprise contacting the deactivated catalyst with an oxidant in the gas phase to provide a regenerated catalyst. Once the deactivated catalyst is contacted with the oxidant, the contaminant composition may react with the oxidant to provide the regenerated catalyst and a regeneration by-product composition, e.g., a vent gas, comprising nitrogen.

The contaminant composition may comprise nitrogen-containing compounds, e.g., products of polyamide decomposition, e.g., polyamide polymers, polyamide oligomers, amide monomers, carboxylic acids, caprolactam, aminocaproic acid (6-aminocaproic acid), or high boiling point products, or combinations thereof. In some embodiments, the contaminant composition comprises products of polyamide-6 (PA6) decomposition, e.g., PA6 polymers, PA6 oligomers, carboxylic acids, caprolactam, 6-aminocaproic acid, or high boiling point products, or combinations thereof.

The gas phase oxidant may comprise one gas or a mixture of gases. Suitable gas phase oxidants include oxygen gas ($O_2$), mixtures of $O_2$ and nitrogen ($N_2$), mixtures of air and $O_2$, and air, for example.

The (gas phase) oxidant may comprise oxygen in an amount ranging from 0.5% to 100%, e.g., from 1% to 95%, from 5% to 90%, from 10% to 85%, from 15% to 80%, from 20% to 75%, from 25% to 70%, from 30% to 65%, from 35% to 60%, from 40% to 55%, or from 45% to 50%. In terms of upper limits, the (gas phase) oxidant may comprise oxygen in an amount less than 100%, e.g., less than 95%, less than 90%, less than 85%, less than 80%, less than 75%, less than 70%, less than 65%, less than 60%, less than 55%, or less than 50%. In terms of lower limits, the (gas phase) oxidant may comprise oxygen in an amount greater than 0.5%, e.g., greater than 1%, greater than 5%, greater than 10%, greater than 15%, greater than 20%, greater than 25%, greater than 30%, greater than 35%, greater than 40%, or greater than 45%.

In an embodiment, the (gas phase) oxidant may comprise oxygen in an amount ranging from 0.5% to 21%, e.g., from 1% to 20%, from 2% to 19%, from 3% to 18%, from 4% to 17%, from 5% to 16%, from 6% to 15%, from 7% to 14%, from 8% to 13%, from 9% to 12%, or from 10% to 11%. In terms of upper limits, the oxidant may comprise oxygen in an amount less than 21%, e.g., less than 20%, less than 19%, less than 18%, less than 17%, less than 16%, less than 15%, less than 14%, less than 13%, less than 12%, or less than 11%. In terms of lower limits, the oxidant may comprise oxygen in an amount greater than 0.5%, e.g., greater than 1%, greater than 2%, greater than 3%, greater than 4%, greater than 5%, greater than 6%, greater than 7%, greater than 8%, greater than 9%, or greater than 11%.

Following reaction with the (gas phase) oxidant, the amount of contaminant present may be significantly decreased. Specifically, following reaction with the oxidant, the regenerated catalyst may comprise low amounts, if any, of the contaminant composition, for example, in an amount ranging from 0 wt. % to 10 wt. % e.g., from 0.5 wt. % to 9 wt. %, from 1 wt. % to 8 wt. %, from 2 wt. % to 7 wt. %, from 3 wt. % to 6 wt. %, or from 4 wt. % to 5 wt. %, from 0 wt. % to 2 wt. %, from 0.5 wt. % to 1 wt. %, or from 0 wt. % to 0.5 wt. %. In terms of upper limits, the catalyst may comprise the contaminant composition in an amount of less than 10 wt. %, e.g., less than 9 wt. %, less than 8 wt. %, less than 7 wt. % less than 6 wt. %, of less than 5 wt. %. In terms of lower limits, the catalyst may comprise the contaminant composition in an amount 0% or in an amount of greater than 0 wt. %, e.g., greater than 0.5 wt. %, greater than 1 wt. %, greater than 2 wt. %, greater than 3 wt. %, or greater than 4 wt. %.

Nitrogen-Containing Contaminants

The deactivated/contaminated catalyst comprises one or more nitrogen-containing compounds. Contacting the nitrogen-containing compounds with an oxidant may facilitate the reaction of the deactivated catalyst (and the contaminants thereof) with oxygen, which may then form elemental nitrogen, carbon dioxide, water, and low molecular weight amines.

The nitrogen-containing contaminants may include polyamide polymers, polyamide oligomers, amide monomers, caprolactam, aminocaproic acid, 6-methylcaprolactam, 6-methylvalerolactam, cyclic caprolactam dimers, 6-aminocaproic acid, or high boiling point products, or combinations thereof. The nitrogen-containing contaminants are different from conventional carbonaceous contaminants, e.g., those described in CN113413924A. The contaminants described herein may include a significant portion of nitrogen, for example, greater than 10% nitrogen, e.g., greater than 12% nitrogen, greater than 15% nitrogen, greater than 20% nitrogen, 25% nitrogen, e.g., greater than 30% nitrogen, or greater than 35% nitrogen, greater than 40% nitrogen, greater than 45% nitrogen, greater than 50% nitrogen, greater than 55% nitrogen, greater than 60% nitrogen, greater than 65% nitrogen, greater than 70% nitrogen, greater than 75% nitrogen, or greater than 80% nitrogen.

In contrast, conventional carbonaceous contaminants mostly carbon and hydrogen, e.g., less than 80% nitrogen, less than 70% nitrogen, less than 60% nitrogen, less than 50% nitrogen, less than 40% nitrogen, less than 30% nitrogen, less than 20% nitrogen, or less than 10% nitrogen.

The nitrogen-containing contaminants described herein may be the by-products of caprolactam polymerization. In some cases, the conventional carbonaceous contaminants are not (nitrogen-containing) polymers or oligomers and or carbon tars, or high carbon-content deposits.

The deactivated/contaminated catalyst may comprise the nitrogen containing compounds in an amount ranging from 1 wt. % to 25 wt. %, e.g., from 2 wt. % to 24 wt. %, from 3 wt. % to 23 wt. %, from 4 wt. % to 22 wt. %, from 5 wt. % to 21 wt. %, from 6 wt. % to 20 wt. %, from 7 wt. % to 19 wt. %, from 8 wt. % to 18 wt. %, from 9 wt. % to 17 wt. %, from 10 wt. % to 16 wt. %, from 11 wt. % to 15 wt. %, or from 12 wt. % to 14 wt. %. In terms of upper limits, deactivated/contaminated catalyst may comprise the nitrogen containing compounds in an amount less than 25 wt. %, e.g., less than 24 wt. %, less than 23 wt. %, less than 22 wt. %, less than 21 wt. %, less than 20 wt. %, less than 19 wt. %, less than 18 wt. %, less than 17 wt. %, less than 16 wt. %, less than 15 wt. %, or less than 14 wt. %. In terms of lower limits, the deactivated/contaminated catalyst may comprise the nitrogen containing compounds in an amount greater than 1 wt. %, e.g., greater than 2 wt. %, greater than 3 wt. %, greater than 4 wt. %, greater than 5 wt. %, greater than 6 wt. %, greater than 7 wt. %, greater than 8 wt. %, greater than 9 wt. %, greater than 10 wt. %, greater than 11 wt. %, greater than 12 wt. %, or greater than 13 wt. %.

The catalyst may comprise little, if any, synergists. Without wishing to be bound by theory, such synergist-free catalysts may be more robust towards oxidative regeneration processes because there is no potential for loss of the synergist during regeneration. And as discussed above, the use of low-synergist catalysts, e.g., low-phosphorus catalyst, provides for the aforementioned environmental benefits.

One example of a synergist is phosphorus. The catalyst may comprise phosphorous in amount ranging from 0 to 1 wt. %, e.g., from 1 ppb to 5000 ppm, from 10 ppb to 2500 ppm, from 100 ppb to 1000 ppm, from 1 ppm to 500 ppm, from 50 ppm to 250 ppm, or from 100 ppm to 200 ppm. In terms of upper limits, the amount of phosphorous present in the catalyst can be less than 1 wt. %, e.g., less than 5000 ppm, less than 2500 ppm, less than 1000 ppm, or less than 500 ppm, less than 250 ppm, less than 100 ppm, less than 50 ppm, or less than 10 ppm. In terms of lower limits, the amount of phosphorous present in the catalyst can be greater than 1 ppb, e.g., greater than 10 ppb, greater than 100 ppb, greater than 1 ppm, greater than 10 ppm, greater than 25 ppm, greater, than 50 ppm, greater than 100 ppm, or greater than 250 ppm. Lower amounts, e.g., less than 1 ppb, and higher amounts, e.g., greater than 1 wt. %, are also contemplated. In an embodiment, the amount of phosphorous is less than 1 ppm.

Additional details about the catalyst are provided below.

Regeneration Conditions

As noted above, conventional oxidative processes utilize concentration ramps, in which the amount of oxidant, e.g., oxygen, changes over time. This process introduces added complication and labor demand. The present disclosure provides a method in which oxygen is added at a steady rate during catalyst regeneration, thereby simplifying the process and rendering the method more efficient.

The temperature during catalyst regeneration may range from 300° C. to 600° C., e.g., from 325° C. to 575° C., from 350° C. to 550° C., from 375° C. to 525° C., from 400° C. to 500° C., or from 425° C. to 475° C. In terms of upper limits, the temperature during catalyst regeneration may be less than 600° C., e.g., less than 590° C., less than 580° C., less than 570° C., less than 560° C., less than 550° C., less than 540° C., less than 530° C., less than 520° C., less than 510° C., less than 500° C., less than 490° C., less than 480° C., less than 475° C., less than 470° C., less than 460° C., or less than 450° C. In terms of lower limits, the temperature during catalyst regeneration may be greater than 300° C., e.g., greater than 310° C., greater than 320° C., greater than 325° C., greater than 330° C., greater than 340° C., greater than 350° C., greater than 360° C., greater than 370° C., greater than 375° C., greater than 380° C., greater than 390° C., greater than 400° C., greater than 410° C., greater than 420° C., greater than 425° C., greater than 430° C., or greater than 440° C. Higher temperatures, e.g., greater than 600° C., and lower temperatures, e.g., lower than 300° C., are also contemplated. At very high temperatures, e.g., greater than 700° C., damage to the catalyst may occur.

In some cases, the temperature may be increased during catalyst regeneration, e.g., a temperature gradient may be employed. The difference between the initial temperature and the final temperature may be less than 350° C., e.g., e.g., less than 325° C., less than 300° C., less than 275° C., less than 250° C., less than 225° C., less than 200° C., less than 175° C., less than 150° C., less than 125° C., less than 100° C., or less than 75° C.

As described above, catalyst regeneration may comprise contacting the deactivated catalyst with an oxidant. The contacting may comprise a period of time less than 150 hours, e.g., less than 125 hours, less than 100 hours, less than 90 hours, less than 80 hours, less than 70 hours, less than 60 hours, less than 50 hours, less than 40 hours, less than 30 hours, less than 20 hours, less than 19 hours, less than 18 hours, less than 17 hours, less than 16 hours, less than 15 hours, less than 14 hours, less than 13 hours, less than 12 hours, less than 11 hours, less than 10 hours, less than 9 hours, less than 8 hours, less than 7 hours, less than 6 hours, or less than 5 hours. In terms of upper limits, the contacting may comprise a period of time less than 150 hours, e.g., less than 125 hours, less than 100 hours, less than 90 hours, less than 80 hours, less than 70 hours, less than 60 hours, less than 50 hours, less than 40 hours, less than 30 hours, or less than 20 hours. In terms of lower limits, the contacting may comprise a period of time greater than 1 hour, e.g., greater than 5 hours, greater than 6 hours, greater than 7 hours, greater than 8 hours, greater than 9 hours, greater than 10 hours, greater than 11 hours, greater than 12 hours, greater than 13 hours, greater than 14 hours, greater than 15 hours, greater than 16 hours, greater than 17 hours, greater than 18 hours, or greater than 19 hours.

The pressure during catalyst regeneration may range from 0 psi to 50 psi, e.g., from 5 psi to 45 psi, from 10 psi to 40 psi, from 15 psi to 35 psi, or from 20 psi to 30 psi. In terms of upper limits, the pressure may be less than 50 psi, e.g., less than 45 psi, less than 40 psi, less than 35 psi, less than 30 psi, or less than 25 psi. In terms of lower limits, the pressure may be greater than 0 psi, e.g., greater than 5 psi, greater than 10 psi, greater than 15 psi, or greater than 20 psi. Higher pressures, e.g., greater than 50 psi, are also contemplated.

Vent Stream

As noted above, the disclosed process yields an environmentally-friendly regeneration by-product vent stream. As the contaminant composition is oxidized, a regeneration by-product composition, e.g., a vent stream, is produced. The regeneration by-product composition may comprise nitrogen ($N_2$), carbon dioxide ($CO_2$), and water, for example.

The regeneration by-product composition may comprise nitrogen in an amount ranging from 0.1 mol % to 99 mol %, e.g., from 0.5 mol % to 95 mol %, from 1 mol % to 90 mol %, from 5 mol % to 85 mol %, from 10 mol % to 80 mol %, from 15 mol % to 75 mol %, from 20 mol % to 70 mol %, from 25 mol % to 65 mol %, from 30 mol % to 60 mol %, from 35 mol % to 55 mol %, or from 40 mol % to 50 mol %. In terms of upper limits, the regeneration by-product composition may comprise nitrogen in an amount less than 99 mol %, e.g., less than 95 mol %, less than 90 mol %, less than 85 mol %, less than 80 mol %, less than 75 mol %, less than 70 mol %, less than 65 mol %, less than 60 mol %, less than 55 mol %, or less than 50 mol %. In terms of lower limits, the regeneration by-product composition may comprise nitrogen in an amount greater than 0.1 mol %, e.g., greater than 0.5 mol %, greater than 1 mol %, greater than 5 mol %, greater than 10 mol %, greater than 15 mol %, greater than 20 mol %, greater than 25 mol %, greater than 30 mol %, greater than 35 mol %, greater than 40 mol %, or greater than 45 mol %. In some cases, the regeneration by-product may comprise nitrogen in an amount ranging from 20 mol % to 99 mol %, e.g., from 20 mol % to 90 mol %, from 30 mol % to 80 mol %, from 40 mol % to 70 mol %, or from 50 mol % to 60 mol %. In an embodiment, the regeneration by-product composition may comprise nitrogen in an amount ranging from 55 mol % to 85 mol %.

The regeneration by-product composition may comprise carbon dioxide in an amount ranging from 0 mol % to 20 mol %, e.g., from 0.1 mol % to 20 mol %, from 0.5 mol % to 19 mol %, from 1 mol % to 18 mol %, from 2 mol % to 17 mol %, from 3 mol % to 16 mol %, from 4 mol % to 15 mol %, from 5 mol % to 14 mol %, from 6 mol % to 13 mol %, from 7 mol % to 12 mol %, from 8 mol % to 11 mol %, or from 9 mol % to 10 mol %. In terms of upper limits, the regeneration by-product composition may comprise carbon dioxide in an amount ranging less than 20 mol %, e.g., less than 19 mol %, less than 18 mol %, less than 17 mol %, less than 16 mol %, less than 15 mol %, less than 14 mol %, less than 13 mol %, less than 12 mol %, less than 11 mol %, or less than 10 mol %. In terms of lower limits, the regeneration by-product composition may comprise carbon dioxide in an amount ranging greater than 0 mol %, e.g., greater than 0.1 mol %, greater than 0.5 mol %, greater than 1 mol %, greater than 2 mol %, greater than 3 mol %, greater than 4 mol %, greater than 5 mol %, greater than 6 mol %, greater than 7 mol %, greater than 8 mol %, or greater than 9 mol %. In some cases, the regeneration by-product composition may comprise carbon dioxide in an amount ranging from 0 mol % to 5 mol %, e.g., from 0.1 mol % to 5 mol %, from 0.5 mol % to 4.5 mol %, from 1 mol % to 4 mol %, from 1.5 mol % to 3.5 mol %, or from 2 mol % to 3 mol %.

The regeneration composition may comprise water in an amount ranging from 0 mol % to 40 mol %, e.g., from 0.1 mol % to 40 mol %, from 0.5 mol % to 38 mol %, from 1 mol % to 36 mol %, from 2 mol % to 34 mol %. From 4 mol % to 32 mol %, from 6 mol % to 30 mol %, from 8 mol % to 28 mol %, from 10 mol % to 26 mol %, from 12 mol % to 24 mol %, from 14 mol % to 22 mol %, or from 16 mol % to 20 mol %. In terms of upper limits, the regeneration composition may comprise water in an amount less than 40 mol %, e.g., less than 38 mol %, less than 36 mol %, less than 34 mol %, less than 32 mol %, less than 30 mol %, less than 28 mol %, less than 26 mol %, less than 24 mol %, less than 22 mol %, or less than 20 mol %. In terms of lower limits, the regeneration composition may comprise water in an amount greater than 0 mol %, e.g., greater than 0.1 mol %, greater than 0.5 mol %, greater than 1 mol %, greater than 2 mol %, greater than 4 mol %, greater than 6 mol %, greater than 8 mol %, greater than 10 mol %, greater than 12 mol %, greater than 14 mol %, greater than 16 mol %, or greater than 18 mol %. %. In some cases, the regeneration by-product composition may comprise water in an amount ranging from 0 mol % to 5 mol %, e.g., from 0.1 mol % to 5 mol %, from 0.5 mol % to 4.5 mol %, from 1 mol % to 4 mol %, from 1.5 mol % to 3.5 mol %, or from 2 mol % to 3 mol %.

The regeneration by-product composition may further comprise low molecular weight amines, e.g., amines with a molecular weight of 105 g/mol. For example, the low molecular weight amines may include methylamine, ethylamine, propylamine, butylamine, pentylamine, hexylamine, other $C_3$-$C_6$ amines, and combinations.

The regeneration by-product composition may comprise low molecular weight amines in an amount ranging from 1 wt. % to 25 wt. %, e.g., from 2 wt. % to 24 wt. %, from 3 wt. % to 23 wt. %, from 4 wt. % to 22 wt. %, from 5 wt. % to 21 wt. %, from 6 wt. % to 20 wt. %, from 7 wt. % to 19 wt. %, from 8 wt. % to 18 wt. %, from 7 wt. % to 17 wt. %, from 9 wt. % to 16 wt. %, from 10 wt. % to 15 wt. %, from 11 wt. % to 14 wt. %, or from 12 wt. % to 13 wt. %. In terms of upper limits, the regeneration by-product composition may comprise low molecular weight amines in amount less than 25 wt. %, e.g., less than 24 wt. %, less than 23 wt. %, less than 22 wt. %, less than 21 wt. %, less than 20 wt. %, less than 19 wt. %, less than 18 wt. %, less than 17 wt. %, less than 16 wt. %, less than 15 wt. %, less than 14 wt. %, or less than 13 wt. %. In terms of lower limits, the regeneration by-product composition may comprise low molecular weight amines in an amount greater than 1 wt. %, e.g., greater than 2 wt. %, greater than 3 wt. %, greater than 4 wt. %, greater than 5 wt. %, greater than 6 wt. %, greater than 7 wt. %, greater than 8 wt. %, greater than 9 wt. %, greater than 10 wt. %, greater than 11 wt. %, or greater than 12 wt. %.

Advantageously, in some cases, the regeneration by-product stream may be similar to air in its composition, unlike conventional processes that may include environmentally unfriendly components. Specifically, the regeneration by-product stream may comprise nitrogen ($N_2$) in an amount ranging from 65 wt. % to 85 wt. %, e.g., from 66 wt. % to 84 wt. %, from 67 wt. % to 83 wt. %, from 68 wt. % to 82 wt. %, from 69 wt. % to 81 wt. %, from 70 wt. % to 80 wt. %, from 71 wt. % to 79 wt. %, from 72 wt. % to 78 wt. %, from 73 wt. % to 77 wt. %, from 74 wt. % to 76 wt. %, or from 75 wt. % to 75.5 wt. %. In terms of upper limits, the regeneration by-product stream may comprise nitrogen in an amount less than 85 wt. %, e.g., less than 84 wt. %, less than 83 wt. %, less than 82 wt. %, less than 80 wt. %, less than 79 wt. %, less than 78 wt. %, less than 77 wt. %, less than 76 wt. %, or less than 75.5 wt. %. In terms of lower limits, the regeneration by-product stream may comprise nitrogen in an amount greater than 65 wt. %, e.g., greater than 66 wt. %, greater than 67 wt. %, greater than 68 wt. %, greater than 69 wt. %, greater than 70 wt. %, greater than 71 wt. %, greater than 72 wt. %, greater than 73 wt. %, greater than 74 wt. %, or greater than 75 wt. %.

In some cases, the regeneration by-product stream may comprise oxygen (02) in an amount ranging from 15 wt. % to 30 wt. %, e.g., from 16 wt. % to 29 wt. %, from 17 wt. % to 28 wt. %, from 18 wt. % to 27 wt. %, from 19 wt. % to 26 wt. %, from 20 wt. % to 25 wt. %, from 21 wt. % to 24 wt. %, or from 22 wt. % to 23 wt. %. In terms of upper limits, the regeneration by-product stream may comprise oxygen in an amount less than 30 wt. %, e.g., less than 29 wt. %, less than 28 wt. %, less than 27 wt. %, less than 26 wt. %, less than 25 wt. %, less than 24 wt. %, or less than 23 wt. %. In terms of lower limits, the regeneration by-product stream may comprise oxygen in an amount greater than 15 wt. %, e.g., greater than 16 wt. %, greater than 17 wt. %, greater than 18 wt. %, greater than 19 wt. %, greater than 20 wt. %, greater than 21 wt. %, or greater than 22 wt. %.

In some cases, the regeneration by-product stream may comprise carbon dioxide ($CO_2$) in an amount ranging from 10 ppm to 5 wt. %, e.g., from 100 ppm to 4 wt. %, from 1000 ppm to 3 wt. %, from 0.5 wt. % to 2 wt. %, or from 1 wt. % to 1.5 wt. %. In terms of upper limits, the regeneration by-product stream may comprise carbon dioxide in an amount less than 5 wt. %, e.g., less than 4 wt. %, less than 3 wt. %, less than 2 wt. %, or less than 1.5 wt. %. In terms of lower limits, the regeneration by-product stream may comprise carbon dioxide in an amount greater than 10 ppm, e.g., greater than 100 ppm, greater than 1000 ppm, greater than 0.5 wt. %, or greater than 1 wt. %.

In some cases, the regeneration by-product stream may comprise water in an amount ranging from 10 ppm to 5 wt. %, e.g., from 100 ppm to 4 wt. %, from 1000 ppm to 3 wt. %, from 0.5 wt. % to 2 wt. %, or from 1 wt. % to 1.5 wt. %. In terms of upper limits, the regeneration by-product stream may comprise water in an amount less than 5 wt. %, e.g., less than 4 wt. %, less than 3 wt. %, less than 2 wt. %, or less than 1.5 wt. %. In terms of lower limits, the regeneration by-product stream may comprise water in an amount greater than 10 ppm, e.g., greater than 100 ppm, greater than 1000 ppm, greater than 0.5 wt. %, or greater than 1 wt. %.

Catalyst Composition

As noted above, the catalyst may advantageously comprise little, if any synergists. Specifically, the catalyst may comprise little or no phosphorous.

Further, the catalyst may advantageously comprise little, if any, of an active metal, e.g., less than 5 wt. % of an active metal, and/or little, if any, of other synergists, e.g., phosphorus. The use of the disclosed catalyst has been unexpectedly found to contribute to the aforementioned improvements in reaction efficiency.

The catalyst comprises a base catalyst and little, if any, active metal. In some cases, the base catalyst may comprise a zeolite catalyst. Many zeolite catalysts are known. For example, the base catalyst may comprise MFI (ZSM-5), FAU (faujasite, USY), *BEA (beta), MOR (high-silica mordenite), and FER (high-silica ferrierite).

The amount of active metals in the catalyst can range from 0 to 5 wt. %, e.g., from 1 ppb to 4 wt. %, from 10 ppb to 2 wt. %, from 100 ppb to 1 wt. %, from 1 ppm to 5000 ppm, from 10 ppm to 2500 ppm, from 50 ppm to 1000 ppm, from 100 ppm to 500 ppm, or from 150 ppm to 250 ppm. In terms of upper limits, the amount of active metals in the catalyst can be less than 5 wt. %, e.g., less than 4 wt. %, less than 2 wt. %, less than 1 wt. %, less than 5000 ppm, less than 2500 ppm, less than 1000 ppm, less than 500 ppm, less than 250 ppm, less than 100 ppm, less than 50 ppm, or less than 10 ppm. In terms of lower limits, the amount of active metals in the catalyst can be greater than 1 ppb, e.g., greater than 10 ppb, greater than 100 ppb, greater than 1 ppm, greater than 10 ppm, greater than 50 ppm, greater than 100 ppm, greater than 250 ppm, greater than 500 ppm, greater than 1000 ppm, or greater than 2500 ppm. Lower amounts, e.g., less than 1 ppb, and higher amounts, e.g., greater than 5 wt. %, are also contemplated.

The silica to alumina ratio (SAR) of the catalyst can, for example, range from 25 to 200, e.g., from 40 to 150, from 50 to 125, or from 75 to 100. In terms of upper limits, the SAR of the catalyst can be 200 or less, e.g., 150 or less, 125 or less, or 100 or less. In terms of lower limits, the SAR of the catalyst can be greater than 25, e.g., greater than 40, greater than 50, or greater than 75. Lower ratios, e.g., less than 25, and higher ratios, e.g., greater than 200, are also contemplated Production of ACN The manner in which the ACN production reaction may be conducted may vary widely. In some cases, the reaction may be conducted in a fixed bed reactor. It has been discovered that fixed bed reactors surprisingly provide for improved uniformity of temperature and good contact between the catalyst and reactants. Advantageously, these reactors also contribute low equipment costs for construction, operation, and maintenance.

The reaction may be conducted at a temperature ranging from 250° C. to 500° C., e.g., from 275° C. to 475° C., from 300° C. to 450° C., from 325° C. to 425° C., or from 350° C. to 400° C. In terms of upper limits, reaction may be conducted at a temperature less than 500° C., less than 475° C., less than 450° C., less than 425° C., or less than 400° C. In terms of lower limits, reaction may be conducted at a temperature greater than 250° C., greater than 275° C., greater than 300° C., greater than 350° C., or greater than 375° C. At temperatures below about 300° C., the reaction may not proceed. At temperatures greater than 450° C., the selectivity may decline.

The reaction may be conducted at a pressure ranging from 0 psig to 500 psig, e.g., 1 psig to 450 psig, 5 psig to 400 psig, 10 psig to 350 psig, 50 psig to 300 psig, 100 psig to 250 psig, or 150 psig to 200 psig. In terms of upper limits, the reaction pressure can be less than 500 psig, less than 450 psig, less than 400 psig, less than 350 psig, less than 300 psig, less than 250 psig, or less than 200 psig. In terms of lower limits, the reaction pressure can be greater than 1 psig, greater than 5 psig, greater than 10 psig, greater than 50 psig, greater than 100 psig, or greater than 150 psig. Lower pressures, e.g., less than 1 psig, and higher pressures, e.g. greater than 500 psig, are also contemplated.

Catalyst efficiency may be assessed by monitoring caprolactam conversion, for example. Once conversion drops below a desired value, the catalyst may be regenerated as described above. The regenerated catalyst may provide for caprolactam conversion of greater than 55%, e.g., greater than 57%, greater than 60%, greater than 62%, greater than 65%, greater than 70%, greater than 75%, greater than 80%, greater than 85%, or greater than 90%.

Lower Purity Caprolactam

Conventional processes may require high-purity caprolactam feed streams. Without wishing to be bound by theory, lower impurity content in the feed stream may reduce issues with, for example, catalyst poisoning, thereby reducing the frequency with which a catalyst would require regeneration. The inventors have surprisingly found that, using the processes of the present disclosure, the caprolactam starting materials need not be of high purity. This has further been found to be beneficial because the formation of high purity streams often requires significant processing, which may be costly and complicated. When the disclosed process is employed, lower purity caprolactam feed may be used and similar, if not improved, reaction parameters are demonstrated.

The oxidative regeneration processes disclosed herein may also advantageously allow for lower purity caprolactam in the feed stream. During the reaction of lower purity caprolactam, organic impurities in the feed stream may accumulate on the catalyst, thereby deactivating it. The oxidative regeneration processes disclosed herein results in complete or near-complete oxidation of these impurities to gaseous products, e.g., nitrogen, carbon dioxide, and water. Conventional processes that rely on hydrolysis may fail to remove impurities that are not hydrolysable.

In some cases, the disclosure relates to a process, in some cases conducted in the gas phase, for converting caprolactam to ACN, e.g., 6-ACN. The process comprises the step of contacting a low purity caprolactam feed comprising less than 100 wt. % caprolactam and greater than 100 wppm impurities, with ammonia over a catalyst (thus effectuating the reaction) to produce the ACN, e.g., 6-ACN. In some cases, the impurities comprise aminocaproic acid, 6-aminohexanoic acid, caprolactam dimers, N-methylcaprolactam, N-ethylcaprolactam, N-methylvalerolactam, cyclic caprolactam dimers, cyclohexanone, cyclohexanone, or combinations thereof.

The amount of impurities in the caprolactam feed stream can, for example, range from 100 ppm to 40 wt. %, e.g., 250 ppm to 35 wt. %, 500 ppm to 30 wt. %, 1000 ppm to 25 wt. %, 2500 ppm to 20 wt. %, 5000 ppm to 15 wt. %, 1 wt. % to 10 wt. %, 100 ppm to 5 wt. %, 500 ppm to 4 wt. %, 0.1 wt. % to 4 wt. %, 0.1 wt. % to 3 wt. %, or 0.5 wt. % to 3 wt. %. In terms of upper limits, the amount of impurities in the caprolactam feed stream can be less than 40 wt. %, e.g., less than 35 wt. %, less than 30 wt. %, less than 25 wt. %, less than 20 wt. %, less than 15 wt. %, less than 10 wt. %, less than 5 wt. %, less than 3 wt. %, less than 2 wt. %, or less than 1 wt. %. In terms of lower limits, the amount of impurities in the caprolactam feed stream can be greater than greater than 100 ppm, e.g., greater than 250 ppm, greater than 500 ppm, greater than 1000 ppm, greater than 2500 ppm, greater than 5000 ppm, or greater than 1 wt. %. Lower amounts, e.g., less than 100 ppm, and higher amounts, e.g., greater than 40 wt. %, are also contemplated. The ranges and limits mentioned herein are applicable to individual impurities and to impurities as a whole.

The reaction of the oxidant with the contaminant composition may be an exothermic reaction. In an embodiment, the heat derived from the exothermic reaction may be used to drive an endothermic reaction, e.g., the formation of ACN from caprolactam.

The amount of heat derived from the exothermic reaction, based on combustion of PA6, may range $5\times10^6$ J per 1 kg of contaminant to $5\times10^7$ J per 1 kg of contaminant, e.g., from $6\times10^6$ J to $4\times10^7$ J, from $7\times10^6$ J to $3\times10^7$ J, from $8\times10^6$ J to $2\times10^7$ J, or from $9\times10^6$ J to $1\times10^7$ J. In terms of upper limits, the amount of heat derived from the exothermic reaction may be less than $5\times10^7$ J per 1 kg of contaminant, e.g., less than $4\times10^7$ J, less than $3\times10^7$ J, less than $2\times10^7$ J, or less than $1\times10^7$ J. In terms of lower limits, the amount of heat derived from the exothermic reaction may be greater than $5\times10^6$ J, per 1 kg of contaminant, e.g., greater than $6\times10^6$ J, greater than $7\times10^6$ J, greater than $8\times10^6$ J, or greater than $9\times10^6$ J.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

Some of the components and steps disclosed herein may be considered optional. In some cases, the disclosed compositions, processes, etc. may expressly exclude one or more of the aforementioned components or steps in this description, e.g., via claim language. This is contemplated herein by the inventors. For example, claim language may be modified to recite that the disclosed compositions, processes, streams, etc., do not utilize or comprise one or more of the aforementioned components or steps, e.g., the caprolactam feed stream does not include N-phenylacetamide (or any other of the aforementioned additives). Such negative limitations are contemplated, and this text serves as support for negative limitations for components, steps, and/or features.

Examples

Catalyst Regeneration

A fixed bed reactor was charged with an aluminosilicate zeolite (ZSM-5) catalyst (20 g) comprising less than 1 ppm phosphorous and less than 1 ppm metals. A flow of ammonia (620 $cm^3$/min) and caprolactam (0.26 g/min) was passed over the catalyst at 375° C. under atmospheric pressure. Caprolactam conversion and selectivity for 6-ACN were monitored throughout the experimental run. After 900 hours, the catalyst deactivated and conversion dropped, as shown below in Table 1.

The deactivated catalyst comprised nitrogen-containing contaminants, e.g., fouling material such as by-products of caprolactam polymerization such as PA6, caprolactam oligomers, caprolactam, and/or 6-aminocaproic acid, i.e., not conventional carbonaceous contaminants. These contaminants were present in the deactivated catalyst in an amount greater than 1 wt. %, which had a deleterious effect on the conversion.

The deactivated catalyst (catalyst and nitrogen-containing contaminants) was subjected to elemental analysis (carbon, hydrogen, and nitrogen) by combustion. Table 1 shows the amounts of carbon, nitrogen, and hydrogen in the nitrogen-containing contaminants. The base ZSM-5 catalyst does not burn during combustion analysis; therefore, its composition does not contribute to carbon, hydrogen, or nitrogen to the elemental analysis. The elemental analysis for PA-6 is also provided.

TABLE 1

| | Carbon (%) | Hydrogen (%) | Nitrogen (%) |
|---|---|---|---|
| Catalyst + N-containing Contam. | 9.40 | 1.49 | 1.63 |
| N-containing Contam. | 75.1 | 11.9 | 13.0 |
| PA6 | 74.2 | 11.4 | 14.4 |

As shown above, the contaminants contain a significant amount of nitrogen. Furthermore, the elemental composition of the nitrogen-containing contaminants is at least similar to that of PA6 (polycaprolactam), suggesting that the nitrogen-containing contaminants contain (primarily) PA6 and/or caprolactam oligomers.

The nitrogen-containing contaminants were further analyzed by IR spectroscopy, and the IP spectrum is shown in FIG. 1. Comparison of the IR spectrum of the nitrogen-containing contaminants with a PA6 reference spectrum indicates that the nitrogen-containing contaminants is at least similar in its chemical structure to that of PA6. This again suggests that the nitrogen-containing contaminants contain (primarily) PA6 and/or caprolactam oligomers.

The deactivated catalyst was regenerated in a first regeneration in situ by contacting the catalyst with an oxidant, e.g., air. This was achieved by flowing the air at atmospheric pressure over the catalyst at elevated temperature. The contacting/air flow was conducted for 1 hour at 400° C., followed by 1 hour at 450° C., then 2 hours at 550° C. A regeneration by-product stream exited the regeneration process.

The regeneration by-product stream comprised mostly nitrogen, and oxygen, e.g., approximately 75 wt. % nitrogen and approximately 23 wt. % oxygen, along with other contaminants, e.g., carbon dioxide in an amount of less than 5 wt. %, and water in an amount of less than 5 wt. %. Advantageously, the regeneration by-product stream environmentally friendly and easily disposable, unlike conventional processes that may include environmentally unfriendly components. For example, the regeneration by-product stream comprised low amounts, if any carbon monoxide, ammonia, nitrogen oxides, or phosphorus-containing compounds such as phosphorous pentoxide.

Following the first regeneration, the experimental run was re-started, and both conversion and selectivity were again monitored. After a further 800 hours (1700 hours total), conversion again dropped. The catalyst was then regenerated in a second regeneration in a manner similar to the first regeneration.

Table 2 shows conversion and selectivity at the beginning of the run, after 900 hours, after the first regeneration 1, after 1700 hours, and after the second regeneration.

TABLE 2

| Time (hrs.) | Caprolactam conversion (%) | ACN selectivity (%) |
|---|---|---|
| 0 | 62.3 | 93.7 |
| 900 | 59.3 | 94.3 |
| 954 (after 1$^{st}$ regen. (4 hrs.)) | 62.7 | 93.7 |
| 1700 | 54.4 | 94.5 |
| 1704 (after 2$^{nd}$ regen. (4 hrs.)) | 60.2 | 94.0 |

As shown above, the contacting of the deactivated catalyst with oxidant, as described herein, effectively regenerates the catalyst, e.g., removes nitrogen-containing contaminants, which increases the conversion of the regenerated catalyst, e.g., to approximately the initial level. This regeneration and accompanying conversion increase is advantageously achieved while maintaining selectivity.

Embodiments

As used below, any reference to a series of embodiments is to be understood as a reference to each of those embodiments disjunctively (e.g., "Embodiments 1-4" is to be understood as "Embodiments 1, 2, 3, or 4").

Embodiment 1: A process for regenerating a deactivated catalyst, the process comprising: contacting the deactivated catalyst comprising a nitrogen-containing contaminant with an oxidant to provide a regenerated catalyst comprising less than 0.5% contaminant and a regeneration by-product stream from 0 to 20 mol % carbon dioxide; from 0 to 20 mol % water; and from 20 to 90 mol % nitrogen.

Embodiment 2: The process of Embodiment 1, wherein the nitrogen-containing contaminants are non-carbonaceous contaminants.

Embodiment 3: The process of Embodiment 1 or Embodiment 2, wherein the contacting comprises a temperature gradient, and the difference between the initial temperature and the final temperature is less than 350° C.

Embodiment 4: The process of Embodiments 1-3, wherein the contacting comprises a period of time less than 150 hours.

Embodiment 5: The process of Embodiments 1-4, wherein the nitrogen-containing contaminant compound comprises polyamide polymers, polyamide oligomers, amide monomers, carboxylic acids, caprolactam, aminocaproic acid, or high boiling point products, or combinations thereof.

Embodiment 6: The process of Embodiments 1-5, wherein the catalyst comprises an aluminosilicate zeolite catalyst.

Embodiment 7: The process of Embodiments 1-6, wherein the catalyst comprises less than 1 wt. % phosphorous.

Embodiment 8: The process of Embodiments 1-7, wherein the oxidant comprises oxygen, a mixture of nitrogen and oxygen, a mixture of air and oxygen, or air.

Embodiment 9: The process of Embodiments 1-8, wherein the oxidant is added at a steady rate.

Embodiment 10: The process of Embodiments 1-9, wherein the regeneration by-product stream further comprises carbon dioxide and water.

Embodiment 11: The process of Embodiment 10, wherein the regeneration by-product stream comprises: from 0.1 to 5 mol % carbon dioxide; from 0.1 to 5 mol % water; and from 55 to 85 mol % nitrogen.

Embodiment 12: The process of Embodiment 10, wherein the regeneration by-product stream comprises amines having a molecular weight below 105 g/mol.

Embodiment 13: The process of Embodiments 1-12, wherein the contacting does not employ a hydrolysis reaction.

Embodiment 14: The process of Embodiments 1-13 wherein the process is conducted at a temperature greater than 300° C.

Embodiment 15: The process of Embodiments 1-14, wherein the temperature is from 300° C. to 600° C.

Embodiment 16: The process of Embodiments 1-15, wherein the process is conducted at a pressure of 0 to 50 psig.

Embodiment 17: The process of Embodiments 1-16, wherein the regenerated catalyst is used in an ammonialytic lactam cleavage/dehydration reaction.

Embodiment 18: The process of Embodiment 17, wherein the lactam in the ammonialytic lactam cleavage/dehydration reaction is caprolactam.

Embodiment 19: The process of Embodiment 18, wherein the conversion percentage of caprolactam using the regenerated catalyst is greater than 55%.

Embodiment 20: A process for regenerating a deactivated catalyst used in an ammonialytic lactam cleavage/dehydration reaction, the process comprising: contacting a catalyst with a reactant feed stream comprising ammonia and a lactam; monitoring the catalyst activity to determine when the catalyst is deactivated; and contacting the deactivated catalyst comprising a nitrogen-containing contaminant with an oxidant to provide a regenerated catalyst comprising less than 0.5% contaminant and a regeneration by-product stream comprising nitrogen and from 0 to 20 mol % carbon dioxide; from 0 to 20 mol % water; and from 20 to 90 mol % nitrogen.

We claim:

1. A process for regenerating a deactivated catalyst, the process comprising:

contacting the deactivated catalyst comprising a nitrogen-containing contaminant with an oxidant to provide a regenerated catalyst comprising less than 0.5 wt. % of the nitrogen-containing contaminant and a regeneration by-product stream comprising carbon dioxide, water, nitrogen, and at least one amine having a molecular weight below 105 g/mol.

2. The process of claim 1, wherein the nitrogen-containing contaminant is a non-carbonaceous contaminant.

3. The process of claim 1, wherein the contacting comprises a temperature gradient, and the difference between the initial temperature and the final temperature is less than 350° C.

4. The process of claim 1, wherein the contacting comprises a period of time less than 150 hours.

5. The process of claim 1, wherein the nitrogen-containing contaminant comprises polyamide polymers, polyamide oligomers, amide monomers, carboxylic acids, caprolactam, or aminocaproic acid, or combinations thereof.

6. The process of claim 1, wherein the catalyst comprises an aluminosilicate zeolite catalyst.

7. The process of claim 1, wherein the catalyst comprises less than 1 wt. % phosphorous.

8. The process of claim 1, wherein the oxidant comprises oxygen, a mixture of nitrogen and oxygen, a mixture of air and oxygen, or air.

9. The process of claim 1, wherein the oxidant is added at a steady rate.

10. The process of claim 1, wherein the regeneration by-product stream comprises:

from 0.1 to 20 mol % of the carbon dioxide;
from 0.1 to 40 mol % of the water; and
from 0.1 to 99 mol % of the nitrogen.

11. The process of claim 10, wherein the regeneration by-product stream comprises:

from 0.1 to 5 mol % of the carbon dioxide;
from 0.1 to 5 mol % of the water; and
from 55 to 85 mol % of the nitrogen.

12. The process of claim 1, wherein the at least one amine of the regeneration by-product stream comprises methylamine, ethylamine, propylamine, butylamine, pentylamine, hexylamine, or other $C_3$-$C_6$ amines, or combinations thereof, and wherein the regeneration by-product stream comprises less than 25 wt. % of the at least one amine.

13. The process of claim 1, wherein the contacting does not employ a hydrolysis reaction.

14. The process of claim 1, wherein the process is conducted at a temperature greater than 300° C.

15. The process of claim 14, wherein the temperature is from 300° C. to 600° C.

16. The process of claim 1, wherein the process is conducted at a pressure of 0 to 50 psig.

17. The process of claim 1, wherein the regenerated catalyst is used in an ammonialytic lactam cleavage/dehydration reaction.

18. The process of claim 17, wherein the lactam in the ammonialytic lactam cleavage/dehydration reaction is caprolactam.

19. The process of claim 18, wherein the conversion percentage of caprolactam using the regenerated catalyst is greater than 55%.

20. A process for regenerating a deactivated catalyst used in an ammonialytic lactam cleavage/dehydration reaction, the process comprising:

contacting a catalyst with a reactant feed stream comprising ammonia and a lactam;

monitoring the catalyst activity to determine when the catalyst is deactivated; and contacting the deactivated catalyst comprising a nitrogen-containing contaminant with an oxidant to provide a regenerated catalyst comprising less than 0.5 wt. % of the nitrogen-containing contaminant and a regeneration by-product stream comprising carbon dioxide, water, nitrogen, and at least one amine having a molecular weight below 105 g/mol.

* * * * *